Aug. 27, 1963   N. A. BOLTON   3,102,252
ULTRASONIC VEHICLE DETECTOR
Filed July 28, 1960   3 Sheets-Sheet 1

*INVENTOR.*
N. A. BOLTON
BY Forest H. Hitchcock
HIS ATTORNEY

Aug. 27, 1963 N. A. BOLTON 3,102,252
ULTRASONIC VEHICLE DETECTOR
Filed July 28, 1960 3 Sheets-Sheet 2

*INVENTOR.*
N. A. BOLTON
BY
*Forest B. Hitchcock*
HIS ATTORNEY

Aug. 27, 1963    N. A. BOLTON    3,102,252
ULTRASONIC VEHICLE DETECTOR
Filed July 28, 1960    3 Sheets-Sheet 3
FIG. 4.    WAVE FORMS AND RELAY OPERATION
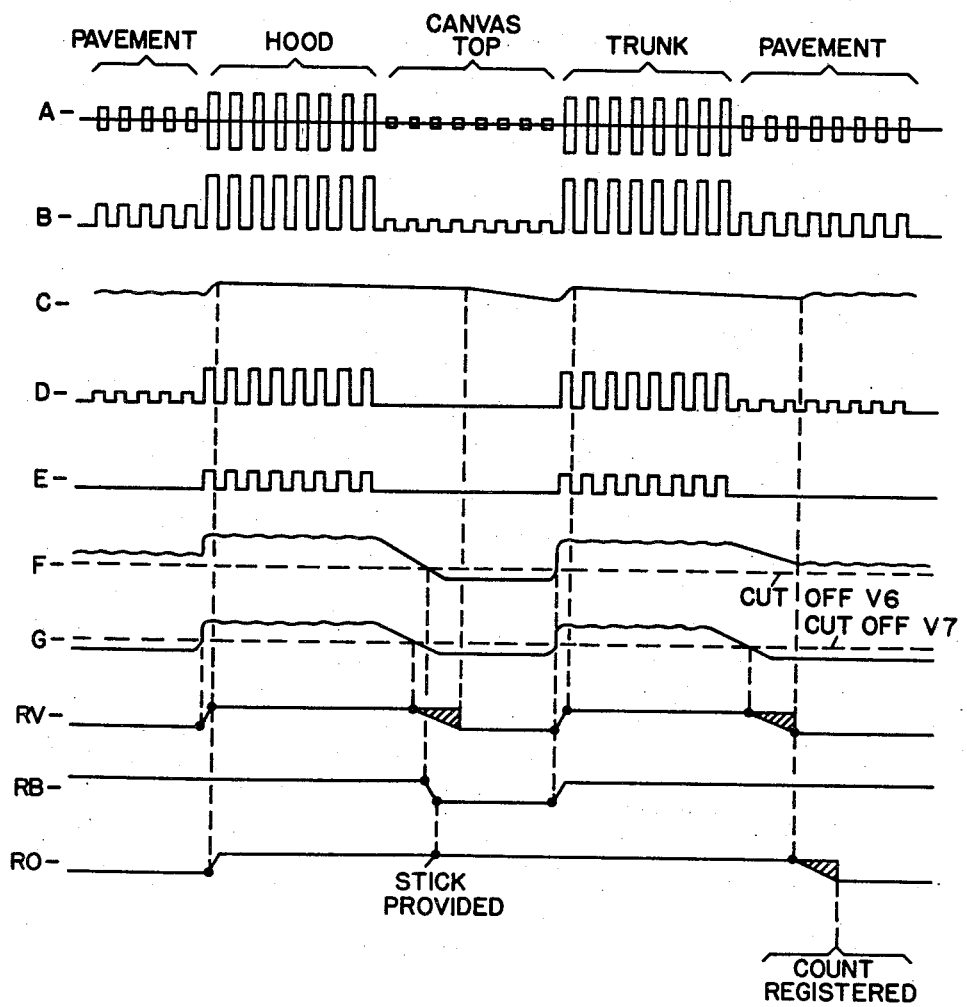
INVENTOR.
N. A. BOLTON
BY
Forest B. Hitchcock
HIS ATTORNEY

United States Patent Office 3,102,252
Patented Aug. 27, 1963

3,102,252
ULTRASONIC VEHICLE DETECTOR
Norman A. Bolton, Scottsville, N.Y., assignor to General Signal Corporation, a corporation of New York
Filed July 28, 1960, Ser. No. 45,980
11 Claims. (Cl. 340—38)

This invention relates to the detection of objects by means of sonic energy, and more particularly to the detection of automotive highway traffic by means of concentrated beams of ultrasonic energy, the reflected component of which varies in magnitude with the presence of a vehicle in a predetermined detection area.

The steady increase of automotive traffic in recent years has created serious problems for traffic engineers in regard to the maintenance of traffic flow both on rural highways and in metropolitan areas. In order to provide the controls necessary to the maintenance of adequate traffic flow, highway traffic control systems must have accurate information concerning the presence of vehicles in particular areas at any given time. This problem may be best exemplified in the case of parking facilities in metropolitan areas where, in order to assure the efficient handling of traffic, a continuous running count must be maintained as to the number of parking spaces available within the area at any given time. Any system for providing this necessarily accurate vehicle information must include detection means which can assure a single, distinct indication of the presence of each passing vehicle, which is relatively unaffected by weather and highway surface conditions, and which provides its indication for vehicles only and not for people, animals, or other spurious causes. The invention herein provides the type of vehicle detection required in these situations.

In the invention herein a continuous or a pulsating beam of sonic energy (preferably in the ultrasonic range), emanating from a transmitting transducer, is directed across a particular portion of a highway in which vehicles are to be detected. This beam normally impinges in the absence of a vehicle on a fixed sound reflecting surface and a portion of the beam is reflected back to a receiving transducer located preferably in proximity to the transmitting transducer. When a vehicle is present, however, the beam is blocked from impinging on the fixed reflecting surface and it is then instead reflected from such vehicle back to the receiving transducer. In the preferred application, the transducers are mounted overhead so that, when no vehicle is present in the passageway being monitored, the transmitted sonic beam impinges on the pavement which serves as the fixed reflecting surface or stationary barrier. Under normal conditions, when no vehicle is within the detection area or zone, the sound beam impinges upon the fixed reflecting surface. Because of the relatively poor reflecting characteristics of this surface, particularly when it is the pavement, and also because of the fairly long propagation path of the sound beam, the reflection of the beam then received by the receiving transducer has a rather low amplitude. However, when a vehicle enters the detection area, the transmitted beam of sonic energy impinges instead upon the surface of the vehicle and not upon the fixed reflecting surface. Since the surfaces of a vehicle are ordinarily of a good sound reflecting nature and since the transmitted and reflected sonic energy now travels a considerably shorter distance through the air because these vehicle surfaces are considerably closer to the transducers, that portion of the sonic energy which is reflected back to the receiving transducer is of greater magnitude than the normally received barrier reflection. The present invention makes use of this phenomenon by making the registration of the presence of a vehicle dependent upon the increased amplitude of the reflected signal occurring when a vehicle is present within the sound beam as compared to that occurring when there is no vehicle present.

Described briefly, the present invention, in the specific form shown, contemplates that the amplitude of reflected signal ordinarily received when no vehicle is present will be used as a reference signal. As long as this reference signal is received, it is clear that there is no vehicle present. However, when a vehicle is interposed between the sound transducers and the fixed sound reflecting surface, the signal received by the receiving transducer is considerably increased in amplitude as compared to the reference signal and this condition is detected so that a distinctive indication may be given of the presence of such vehicle. This comparison of the received vehicle reflection signal with the reference signal greatly increases the reliability of the system since it provides automatic compensation for variations in the characteristics of sound transmission as they vary from time to time. In other words, if only the absolute level of the vehicle reflection signal were relied upon to give an indication of vehicle detection, unreliable operation would result since the absolute level of this signal may vary widely dependent, for example, upon atmospheric conditions. However, by comparing the received reflection signal with the reflection signal ordinarily received from the fixed reflecting surface, the various factors affecting sound transmission become irrelevant since it is then the change in amplitude of the reflected signal between the vehicle and no-vehicle conditions, rather than the absolute level of vehicle reflection signal, that controls.

To effect this operation, it is contemplated by the present invention that the level of the reflected signal ordinarily received when no vehicle is present will be stored to permit it to be subsequently compared in amplitude with the level of reflected signal received when a vehicle is present. This stored voltage may then be considered as a reference voltage, and its amplitude is permitted to vary continuously in accordance with variations in amplitude of the reflection signal received from the fixed reflecting surface. This reference signal is applied to a limiter circuit, and this limiter circuit also receives the output of the receiving means. As long as the received reflection signal has the lower amplitude that it ordinarily has when no vehicle is present, the above-mentioned limiter remains ineffective to supply an output indicative of the presence of a vehicle. However, when a vehicle enters the detection zone, the level of reflected signal rises appreciably. Since the reference voltage is prevented from varying abruptly so as to follow the output of the receiving means, the voltage that the limiter circuit then receives from the receiving means suddenly has a greater amplitude than the reference voltage so that the detection circuit operated by this limiter means is immediately operated to a distinctive condition. When the vehicle leaves the detection zone, the amplitude of the reflection signal is abruptly decreased with the result that the detection circuit just mentioned is restored to its normal condition. The registration of a vehicle is dependent upon the foregoing distinctive operation of this detection means.

It frequently happens that a vehicle will pass through the detection zone having a plurality of sound reflecting surfaces which are spaced by sound absorbing surfaces. An example of such a vehicle is a convertible car having a sound absorbing cloth top between the metallic, sound-reflecting hood and trunk surfaces. Clearly, such a vehicle will provide a high amplitude of reflection signal first when the hood enters the sound beam and again when the trunk enters, but inbetween these two, the received sound beam will be of extremely low or even negligible amplitude, lower in amplitude than the signal received from the fixed reflecting surface, since the cloth top will tend to absorb the sound energy. To prevent such a vehicle from being registered as two separate vehicles, it is contemplated by the present invention that a second detection means will be provided which will be distinctively operated whenever the amplitude of received reflection signals falls appreciably below that normally received from the fixed reflecting surface. Registration of a vehicle is then permitted to occur only as the first above-mentioned detector means is operated in the distinctive manner just described and provided also that the second detection means has not been operated to its distinctive condition as a result of the reception of the very low or negligible level of reflection signal.

It is thus an object of this invention to provide a vehicle detection system of the kind wherein a sound beam is directed toward each passing vehicle and whereby the presence of a vehicle is detected by the difference in amplitude of the reflection signal received when the vehicle is within the beam as compared to when the vehicle is not within the beam.

It is a further objective of this invention to provide a sonic vehicle detection system of the type wherein a sound beam is transmitted toward each passing vehicle and wherein a receiving means receives reflections of the sound beam after reflection from such vehicle and wherein the detection of the vehicle occurs as a result of the difference in amplitude of the signal when a vehicle is present as compared to when it is not present and where said system includes means for automatically compensating for the variations in amplitude of sound after transmission caused by various natural effects such as changes in atmospheric conditions.

It is a further object of this invention to provide a system for registering the presence of a vehicle which is dependent upon the amplitude of the reflected sound energy received from such vehicle and wherein a vehicle having a plurality of sound reflecting surfaces spaced by sound absorbing surfaces is still registered as a single vehicle.

Other objects, purposes and characteristic features of the present invention will be in part obvious from the accompanying drawings, and in part pointed out as the description of the invention progresses.

In describing the invention in detail, reference will be made to the accompanying drawings in which like reference characters designate corresponding parts throughout the several views, and in which:

FIG. 4 is a chart showing waveforms taken at various points of the circuits illustrated in FIG. 2 and the sequence of operation of the relays shown in FIG. 2 in response to the passage of a convertible automobile as depicted in FIGS. 3A through 3D.

For the purpose of simplifying the illustration and facilitating in the explanation, the various parts and circuits constituting the embodiment of the invention have been shown diagrammatically and certain conventional elements have been left in block form, the drawings having been made more with the purpose of making it easy to understand the principles and mode of operation, than with the idea of illustrating the specific construction and arrangement of parts that would be employed in practice. Thus, the various relays and electronic elements are illustrated in a conventional manner. The symbols (+) and (−) are used to indicate connections to the terminals of a battery or other source of electric current, suitable for the operation of electromagnetic relays and the like; whereas, the symbols (B+) and the symbol for a ground connection indicate connections to the opposite terminals of a source of higher voltage suitable for the operation of electron tubes.

Figure 1:
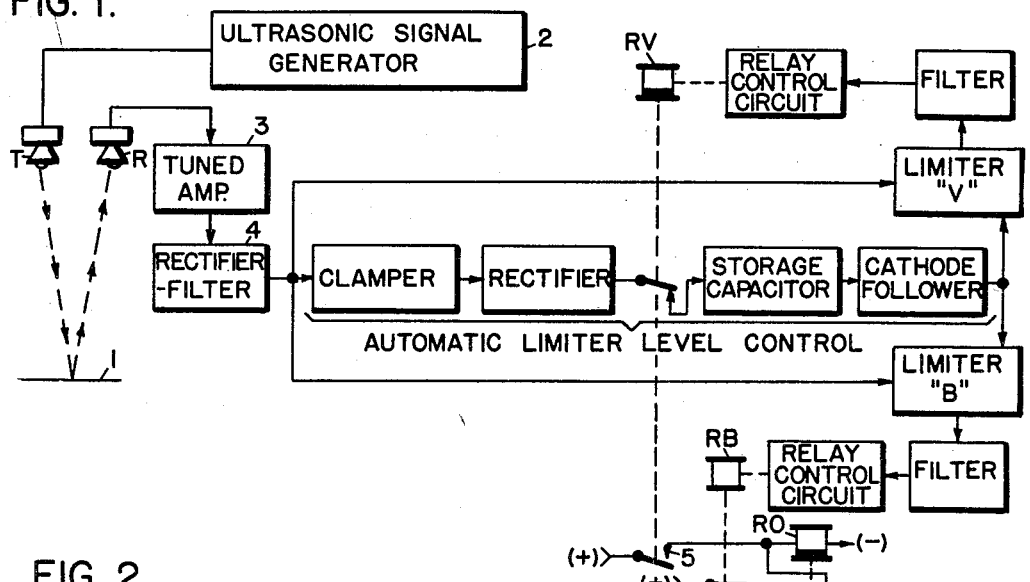
FIG. 1 is a block diagram of the entire system.

Referring now to FIG. 1, transmitting transducer T and receiving transducer R are mounted in proximity to the passageway being monitored by the invention so that sonic energy transmitted by transducer T crosses the path of any vehicle using the monitored passageway impinges on stationary surface or pavement and is reflected back to receiving transducer R. In some applications, the above-suggested overhead mounting may be employed, and in others, especially where only a single lane is being monitored, it may be desirable to mount the transducers at the side of the passageway and to position a reflective barrier on the opposite side of the passageway to reflect back to the receiving transducer the sonic energy directed at it by transducer T. Whichever mounting method is used, the transducers are positioned so that vehicles using the passageway travel between the transducers and the fixed reflective surface 1.

The transmitting transducer T is driven by the ultrasonic signal generator 2 which is a conventional signal generator producing a signal which is preferably in the ultrasonic range such as 25 kc. The signal may be steady or pulsed; for the purpose of this disclosure, it will be assumed that pulses of sound energy are transmitted. Transducer T converts the electrical signal into sonic energy of the same frequency, directing this sonic energy in a beam across the passageway.

Normally, the sonic beam impinges upon the fixed reflecting surface 1, but when a vehicle is present in the pasageway, the sonic beam impinges instead upon the surfaces of the vehicle. In either case, a portion of the transmitted sonic energy is reflected back to transducer R. By virtue of the shorter distance that the reflected sonic energy travels in air when reflected from a passing vehicle as compared to the distance normally travelled when reflected from the stationary reflective barrier, the magnitude of the sonic signal reflected from a passing vehicle is greater than the magnitude of the normally received sonic signal reflected from stationary reflective surface 1. It should be noted that the rounded nature of the surfaces of many vehicles in present use and also their low height may tend to reduce the differential between the vehicle reflection signal and the reflection signal obtained from the fixed reflecting surface. In some instances, it may be necessary to roughen the surface of stationary reflective surface 1 to assure that the sonic signals reflected from it will be weaker than those reflected from the surfaces of the vehicles to be detected. This is merely an obvious matter of design that varies with the particular application of the invention herein.

Pulsed sonic energy received by transducer R is converted into a corresponding electrical signal, and this signal is then passed through tuned amplifier 3 which is tuned to the frequency of the signal produced by ultrasonic signal generator 2. Tuned amplifier 3 serves the dual purpose of discriminating against spurious sonic frequencies that might be received by transducer R while at the same time amplifying the reflected signal.

Following amplification, the received signals are fed to the detection circuits which are illustrated in block form in FIG. 1. The detection circuits comprise barrier signal limiter, B vehicle signal limiter V, and an automatic limiter level control circuit. Limiter B is designed to pass all signals having a magnitude equivalent to or greater than the magnitude of the signals normally received from the fixed reflecting surface 1, while limiter V passes only signals having a magnitude appreciably greater than the normally received barrier reflection, namely, signals reflected from the closer surfaces of passing vehicles.

As long as signals are passing through limiter B barrier, signal relay RB remains in its picked-up position. Since signals are normally received steadily from either stationary reflective surface 1 or from passing vehicles, barrier signal relay RB is normally maintained picked up On the other hand, limiter V only passes the stronger signals reflected from the surfaces of passing vehicles, and vehicle signal relay RV is therefore normally dropped away. When a vehicle enters the detection area causing sonic signals of greater than normal magnitude to be received by transducer R, these signals are passed by limiter V and relay RV is picked up, closing its front contact 5. This completes the circuit from (+), through front contact 5 and the windings of object indication relay RO, to (—), and relay RO picks up closing its front contact 6. This closes the obvious circuit that allows capacitor 7 to charge through resistor 8.

Moments later, when the vehicle passes out of the detection area and the received signal drops back to its normal magnitude as the transmitted sonic energy is once more received from stationary reflective surface 1, limiter V no longer passes the received signal, and relay RV drops away. This opens the circuit maintaining object indication relay RO energized at front contact 5, and relay RO drops away once again, closing its back contact 9. This allows capacitor 7 to discharge through the solenoid of impulse counter 10 which is thereby operated to register the passing of the vehicle.

In the event that pedestrians, animals or birds pass between the transducers and stationary reflective barrier 1, the clothing, fur, or feathers covering their surfaces will absorb rather than reflect the sonic energy beamed by transducer T. In addition, they present only a very small surface for reflection. For these reasons, they do not cause strong reflections and thus do not produce an appreciable signal in the reception circuits.

The receipt and detection of reflected sonic signals will now be discussed in greater detail with reference being made to the schematic illustrated in FIG. 2. As was explained generally above, reflected sonic signals are received by transducer R, converted into electrical energy of the same frequency, amplified by tuned amplifier 3, rectified and filtered by rectifier-filter 4, and then fed through coupling capacitor 12 to the two limiter circuits and to the automatic limiter level control circuit.

Diode V1 and resistor 13 comprise a conventional positive clamping circuit which effectively clamps the signal appearing at point B above ground potential. That is, any negative potential at point B causes the cathode of diode V1 to become more negative than ground. This results in the conduction of diode V1, which, in effect, forms a low resistance path by-passing all negative signals to ground. However, the entire positive-going portion of each signal appears across resistance 13, and it is this positive signal that is utilized by the detection circuits. Waveforms A and B in FIG. 4 may help to visualize this clamping action. Waveform A represents the signal appearing at point A in the tuned amplifier section of the reception circuit, and is intended to illustrate the envelope of a pulsating 25 kc. signal. Because of the action of the clamping circuit just described, it is assured that the unidirectional, square-wave output of rectifier-filter 4 will appear at point B, as a square wave signal whose most negative point is always "clamped" at ground potential, and which varies above ground by an amount substantially equal to the peak-to-peak value of the output of rectifier-filter 4.

Diode V2 allows capacitor 14 to charge through resistor 11a to the maximum positive potential appearing at point B as long as back contact 15 of vehicle signal relay RV remains closed. Since diode V2 only conducts as long as its plate is more positive than its cathode, once capacitor 14 has charged to the maximum positive potential of the signal appearing at point B, diode V2 becomes non-conductive until enough of the positive voltage stored by capacitor 14 has leaked off through resistors 11 and 16 to allow the peak positive voltage at its plate again to exceed the charge stored on capacitor 14. Thus, the potential at the grid of triode V3 (point C) is normally maintained at approximately the maximum positive potential of the signal appearing at point B.

Resistor 17 and triode V3 comprise a conventional cathode follower circuit, the voltage drop across resistor 17 varying directly with the potential maintained at point C. The cathode of triode V3 is connected to the center of a voltage divider network comprised of resistors, 18, 19, 20 and 21. The plate of diode V4 (barrier signal limiter B) is connected to the junction of resistors 18 and 19, while the plate of diode V5 (vehicle signal limiter V) is connected to the junction of resistors 20 and 21. The plate of diode V5 is thus always more positive than the plate of diode V4 by the amount of the combined voltage drop appearing at any given time over resistors 19 and 20. At the same time, the general level of voltage at the plates of diodes V4 and V5 is dependent upon the potential appearing at the cathode of triode V3.

Since the potential at the cathode of triode V3 varies with the maximum potential of the received signal as it appears at point B, it can be seen that, as the magnitude of the normally received reflection from the fixed surface 1 increases or decreases (due to changes in atmospheric conditions, etc.), the voltage at the plates of diodes V4 and V5 similarly increases or decreases. Thus, the plate potentials of diodes V4 and V5, which are the limiting potentials of barrier signal limiter B and vehicle signal limiter V, respectively, constantly maintain the same relative amplitudes with respect to each other and with respect to the magnitude of the normally received sonic signal reflected from stationary reflective surface 1.

The received signal, clamped to ground potential as explained above, appears at point B and is fed simultaneously to the cathodes of diodes V4 and V5. Since these diodes provide a low resistance path for all signals whose potential is less than the voltage maintained upon their respective plates, only that portion of the received signal which exceeds the respective plate potentials of diodes V4 and V5 is passed beyond points D and E. The values for resistors 18, 19, 20, and 21 of the voltage divider network are chosen so that the peaks of the normally received barrier reflection signals will always be of greater potential than the voltage maintained at the plate of diode V4 but never as great as the plate voltage of diode V5. Thus, the peaks of the normally received barrier reflection signal always result in the appearance of a signal at point D but not at point E.

The peaks of the normally received barrier reflection signal are passed to the grid of relay control triode V6 through coupling capacitor 23 and the filter network comprising capacitors 24 and 25 and resistance 26. Triode V6 is biased so that it will remain conductive as long as the potential at its grid is within the range of expected peaks passed by limiter diode V4. The plate circuit of relay control triode V6 includes the windings of fast-acting barrier signal relay RB,, and as long as a signal having a magnitude equivalent to or greater than the normal barrier reflection signal is received and triode V6 remains conductive, relay RB is maintained in its picked-up position.

Similarly, when the received reflection signal is of such amplitude that a signal appears at point E of limiter diode V5, then such signal at point E is coupled to the grid of vehicle signal relay control triode V7 through coupling capacitor 27 and the filter network comprising capacitors 28 and 29 and resistance 30. Vehicle signal limiter diode V5 has its plate voltage maintained at a potential slightly greater than the peaks of the normally received barrier reflection signals, and relay control triode V7 conducts only when the voltage at its grid exceeds the plate potential of limiter diode V5 by a predetermined amount. Thus, vehicle signal relay RV, whose windings are in series with the plate circuit of relay control triode V7, is picked up only in response to received reflected signals having a magnitude greater than the normally received barrier reflection signals, namely, in response to sonic signals reflected from the surfaces of vehicles passing through the detection area.

Figure 2:
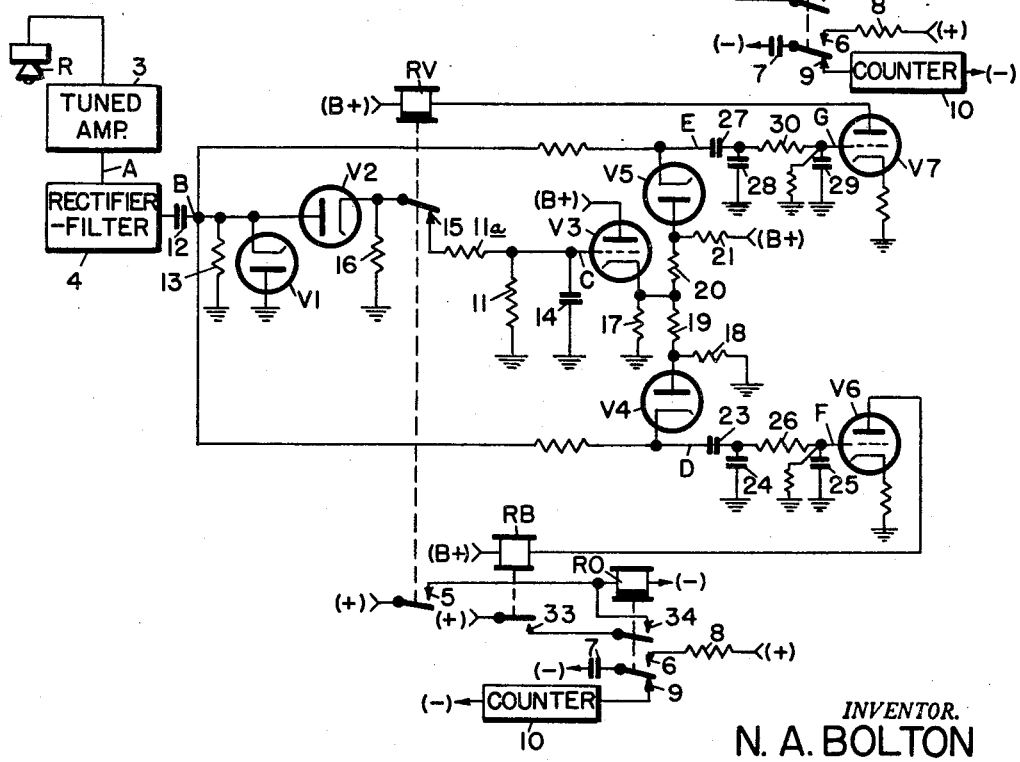
FIG. 2 is a detailed schematic of the detection and indication circuits of the system.

Certain novel features of the detection and indication circuits illustrated in FIG. 2 can best be understood from the standpoint of their operation. Therefore, it will now be assumed that convertible automobile 32 is passing beneath the overhead transducers T and R, in the sequence shown in FIGS. 3A–3D. To facilitate explanation of the operation of the circuits involved, FIG. 4 is a chart of waveforms taken at the various points of FIG. 2 in response to this sequence of assumed facts. FIG. 4 also charts the sequence of operation of the circuit relays which results in response to this assumed passage of convertible 32.

It is further assumed that the sonic frequency generator driving transducer T transmits a continuous series of 25 kc. sound pulses. Transducer T converts this generated signal into a corresponding series of sonic pulses beamed at the pavement. This transmitted sonic beam is reflected from stationary reflective surface 1 (the pavement), and portions of this reflected beam are received by receiving transducer R which converts this sonic energy into an electrical signal comprised of a series of 25 kc. pulses. As was explained above, this received signal is then amplified by tuned amplifier 3 and fed through rectifier-filter 4 to the coupling capacitor 12. Waveform A (FIG. 4) shows the envelopes of the 25 kc. pulses as they pass through the tuned amplifier circuit.

By virtue of the clamping action of diode V1 and resistor 13, the received signal appears at point B as a series of positive squarewave pulses (see waveform B).

As convertible 32 approaches the detection area (FIG. 3A), the transmitted sonic signal still impinges on the pavement, producing the normal signals shown at the extreme left-hand portion of the waveforms in FIG. 4. Storage capacitor 14 maintains the maximum potential of the normal signal at the grid of triode V3 (waveform C), as was explained above, and thus provides the automatic adjustment of the plate voltages of limiter diodes V4 and V5.

The peaks of this normal signal are passed by limiter diode V4 (see waveform D), through coupling capacitor 23 and the filter network, to the grid of barrier signal relay control triode V6 (see waveform F). This normally received signal thus maintains triode V6 conductive which, in turn, holds barrier signal relay RB in its picked up position. Although this normal signal is also fed to the input of vehicle signal limiter diode V5, the peaks of this normal signal are not sufficient to overcome the plate potential of limiter diode V5 which provides a low resistance path for the entire signal. Thus no signal appears at the grid of vehicle signal relay control triode V7, which remains non-conductive, and vehicle signal relay RV remains dropped away.

As soon as convertible 32 enters the detection area, the beam of pulsed sonic energy transmitted by transducer T impinges on its hood (FIG. 3B), and transducer R receives the vehicle reflections which are of appreciably greater magnitude than the normal payment reflections. This results in the production of greater strength signals in the receiver (see waveform A), and in the production of much greater than normal positive pulses at point B.

This greater amplitude of received signal immediately increases the voltage at the cathodes of the limiter diodes V4 and V5 and at the same time, tends to increase the reference voltage stored in capacitor 14. Resistor 11a in the charging circuit of capacitor 14 tends to prevent any abrupt change in the voltage to which this capacitor is charged, however, so that the stored reference voltage cannot change rapidly enough to keep up with the change in received reflection signal. This permits a signal to appear at the grid of tube V7 so that relay RV picks up. This closes front contact 5 and completes the obvious pick-up circuit for object indication relay RO. As was discussed above, when relay RO picks up, closing its front contact 6, capacitor 7 is charged up through resistance 8.

The peaks of these stronger vehicle reflection signals, produced in response to the reflections from the hood of convertible 32, are also passed by carrier signal limiter diode V4. However, since triode V6 is already conducting at this time, no change occurs in this portion of the circuit, and relay RB remains picked up.

When relay RV picks up and opens its back contact 15, storage capacitor 14 is not only disconnected from its charging circuit but as well from its parallel discharge resistor 16. (Resistor 11 has the function of providing a grid leak in the grid circuit of tube V3 and its effectiveness in discharging capacitor 14 is insignificant since it may have several megohms of resistance.) Therefore, during the time a vehicle is within the detection zone, the voltage level across storage capacitor 14 is maintained at approximately the last peak value of the normal barrier reflection signal (see waveform C).

Figure 3A:
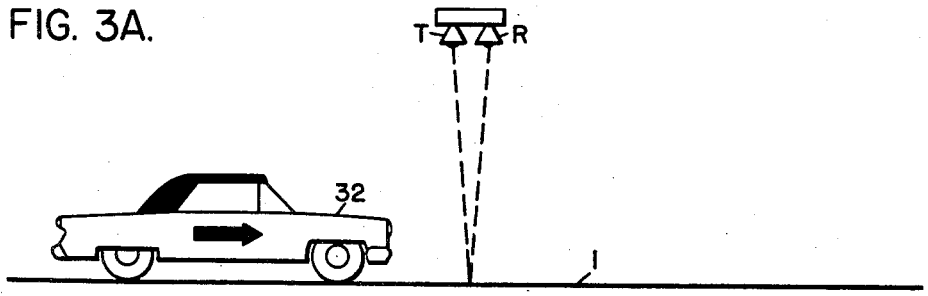
FIGS. 3A, 3B, 3C and 3D illustrate, sequentially, the passage of a convertible automobile through a detection area monitored by the invention.
Figure 3B:
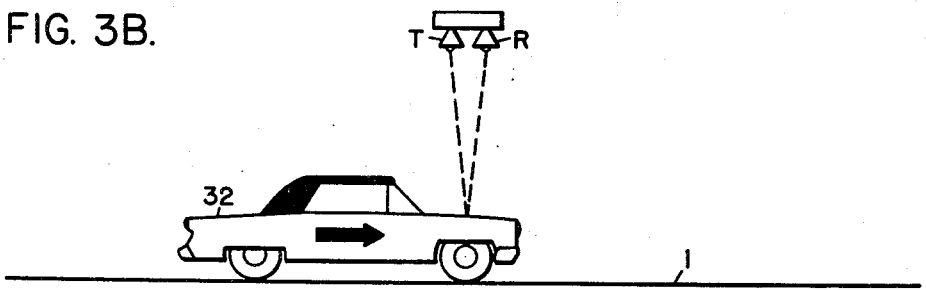
Figure 3C:
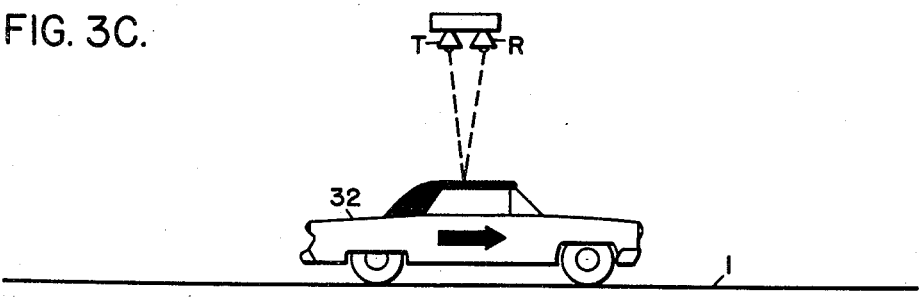

As convertible 32 continues its passage through the detection area, the transmitted sonic beam next impinges on its fabric top (FIG. 3C). Since the fabric top absorbs sonic energy, only a very small amount of the transmitted sonic signal is reflected back to receiving transducer R. This signal reflected from the fabric top is considerably weaker than the normally received barrier reflection, and for this reason the peaks of this weak signal are not of sufficient potential to pass either of the limiter diodes. That is, since the peak potential of this weak signal is less than the plate voltages of both limiter diodes V4 and V5, these diodes provide a low resistance path for all of this weak signal, and while it is being received no signal appears at the grids of either of the relay control triodes. This causes triodes V6 and V7 to conduct such a low value of plate current that both relays RB and RV drop away.

However, while energization is cut off to both relays RB and RV at the same time, these relays do not drop away simultaneously. Relay RB is fast acting, while relay RV is designed to drop away slowly. Therefore, when the weak signals occur as the result of poor reflection from the fabric top of convertible 32, barrier signal relay RB drops away and closes its back contact 33 before vehicle signal relay RV can drop away and open its front contact 5. An instant later, when relay RV finally drops away, object indication relay RO is maintained in its picked-up position by virtue of the stick circuit which is now closed from (+), through back contact 33 of relay RB and front contact 34 of relay RO, and through the windings of relay RO to (−). Thus, although the vehicle signal is completely lost due to the non-reflective nature of the fabric top of convertible 32, relay RO remains picked up, and no count is registered by counter 10.

Figure 3D:
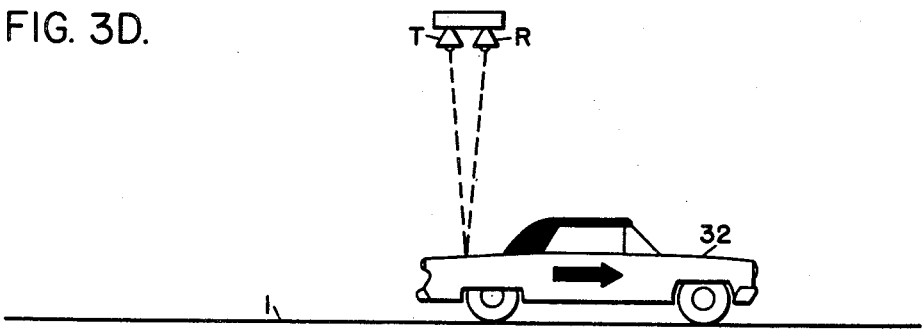

When convertible 32 has continued its passage to the point illustrated in FIG. 3D, strong vehicle signals are once again received as the transmitted sonic beam impinges on the trunk portion of the car. The peaks of this strong signal are once more passed by both of the limiter diodes to the grids of the control triodes, resulting once again in the pick up of relays RB and RV.

The general level of the automatic limiter level control voltage is not appreciably affected by this last sequence of relay operations. Although, once relay RV drops away due to the weak reflection, the discharge path for storage capacitor 14 is once again completed by the closing of back contact 15, the R-C time constant of capacitor 14 and resistor 16 is very slow, and there is relatively small loss of potential during this period. Also, this lost potential is regained to some extent when the strong trunk signal is received since capacitor 14 begins to charge up toward the peak level of the strong trunk signal before relay RV has picked up once again, opening its back contact 15.

After convertible 32 has passed completely through the detection area, the normal barrier reflection is once again received as the transmitted beam impinges on the pavement. As has been explained, the peaks of this normal signal are of sufficient potential to pass barrier signal limiter diode V4 but are not great enough to pass vehicle signal limiter diode V5. Thus, as convertible 32 passes out of the detection area, barrier signal relay RB remains picked up but vehicle signal relay RV drops away.

The dropping away of relay RV opens its front contact 5, and, since relay RB is once again picked up and back contact 33 is open, all energy is removed from the windings of vehicle indication relay RO which, after a slight delay, drops away. This closes back contact 9 of relay RO, providing a discharge path for capacitor 7 through the solenoid of counter 10, and the resulting impulse causes counter 10 to register a unit count, indicating the passage of convertible 32.

The slightly delayed drop-away characteristics of vehicle indication relay RO (indicated by the heavy base line of the symbol designating this relay) has been provided to assure that relay RO will remain picked up during the time that convertible 32 is passing from the position shown in FIG. 3C to that shown in FIG. 3D. It is during this period that the transmitted sonic energy ceases to impinge on the sound-absorbing fabric top and begins to impinge on the reflective trunk portion of the car. It is at this time that the strong vehicle signal is again received causing both barrier signal relay RB and vehicle signal relay RV to pick up once again. Since these relays pick up together at this particular moment, it is possible that back contact 33 of relay RB may open before front contact 5 of relay RV closes. However, since relay RO is designed to drop away slowly, this momentary loss of energy to its windings has no effect, and relay RO is properly maintained in its picked up position.

The above description of the mode of operation has been particularly concerned with a convertible-type auto so that certain features of the invention might be illustrated. It is deemed unnecessary to describe in detail the mode of operation for a conventional vehicle. It will also be apparent to one skilled in the art that certain simple modifications may be made to the specific form of the invention shown to adapt it for the transmission of a beam of steady energy rather than pulsed energy.

It should be obvious that the specific embodiment of the present invention just described is not the only application possible and that the sonic detection means disclosed can be readily adapted to use for counting objects passing on conveyor belt systems, etc. Therefore it should be understood that the disclosed form is selected to facilitate in the disclosure of the invention rather than to limit the number of forms which the invention may assume, and that various modifications, adaptations and alterations may be applied to the specific form shown to meet the requirements of practice, without in any manner departing from the spirit or scope of the present invention.

What I claim is:

1. In a system for detecting the presence of a vehicle as it moves along a selected path and passes through a detection zone the combination comprising, transmitting means including a transducer for directing a zone-defining beam of energy across a path which impinges upon each vehicle as it moves through said zone but impinges instead when no vehicle is present upon a fixed reflecting surface more distant than said vehicle, receiving means including transducer means being positioned and directed to receive reflections of said beam alternatively from each vehicle and from said fixed surface, said receiving means producing an output having at least one distinctive characteristic thereof varying in accordance with the amplitude of the reflected energy received by said receiving means, and detection means being governed according to said distinctive characteristic of said output of said receiving means and being controlled to a distinctive condition indicative of the presence of a vehicle in said zone only when said distinctive characteristic has the value it assumes when said amplitude of said reflected energy is in excess of that normally received from said fixed reflecting surface when no vehicle is present.

2. The system according to claim 1 wherein said beam is directed by said transmitting means downwardly toward the surface of said path over which said vehicle moves and said transducer means included in said receiving means is also positioned over said path and directed downwardly so as to receive reflections of said beam both from the upper surface of each passing vehicle and from the surface of said path when no vehicle is present, said surface of said path corresponding to said fixed reflecting surface.

3. The system according to claim 1 wherein said distinctive characteristic of the output of said receiving means is its amplitude which varies in accordance with the amplitude of the reflected signal received by said receiving means.

4. The system according to claim 2 wherein said detection means includes an electromagnetic relay being operated from its normal state only when the output of said receiving means has an amplitude in excess of that it assumes when the reflected energy received by said receiving means equals that received from said fixed reflecting surface.

5. The system as defined in claim 2 wherein said detection means includes comparison means having a storage device connected to the output of said receiving means for storing a signal continually governed by the amplitude of the reflected signal impinging upon said receiving transducer, said detection means being operated to said distinctive condition only when the received reflection signal exceeds that then represented by said signal stored in said storage device, said detection means when operated to said distinctive condition disconnecting said storage device from said receiving means, whereby despite variations in the amplitude of the signal reflected from said fixed reflecting surface said output means is operated to said distinctive condition only when said reflected signal has an amplitude greater than would then be reflected from said fixed reflecting surface with no vehicle present.

6. The system according to claim 3 wherein said detection means includes object signal means being operated from a normal condition to a distinctive condition by the amplitude of said output of said receiving means only when said reflected energy has a magnitude greater than the magnitude of reflected energy received from said fixed reflecting surface, and additional signal means being operated to a distinctive condition by the amplitude of said output of said receiving means only when said reflected energy has a magnitude less than that received from said fixed reflecting surface, said detection means being controlled to register the presence of an object in said detection zone for so long as said object signal means is in said distinctive condition and also throughout any interval thereafter during which said object signal means is restored to its normal condition but during which said additional signal means is in its said distinctive condition whereby the passage of an object having non-reflective surfaces interspersed between reflective surfaces causes only a single indication.

7. A system for detecting the presence of a vehicle travelling through a designated passageway comprising, transmitting means including a transducer for directing a beam of sound energy across said passageway so as to impinge upon each vehicle but with said beam impinging instead when no vehicle is present upon a fixed reflecting surface more distant from said transducer than the reflecting surfaces of said vehicle, receiving means including transducer means being distinctively responsive to and providing an output signal whose amplitude varies with the amplitude of the reflection of said beam received by said receiving means both from said vehicle and alternatively from said fixed reflecting surface, detection means being controllable in accordance with the amplitude of the output signal of said receiving means, and being maintained in the absence of any vehicle in a normal condition in response to the amplitude of reflection signal obtained from said fixed reflecting surface, said detection means being operated from its normal condition to a first distinctive condition when said receiving means receives a reflection signal lower in amplitude than that normally received from said fixed reflecting surface, said detector means being operated to a second distinctive condition from its normal condition when said receiving means receives a reflection signal greater than that normally received by said receiving means from said fixed reflecting surface, and registering means controlled by said detection means and being operated to a distinctive condition indicative of the presence of a vehicle within said sound beam only when said detection means is operated to said distinctive condition and being thereafter maintained in said distinctive, presence indicating, condition until said detector means is restored to its said normal condition whereby a vehicle having a plurality of energy reflecting surfaces spaced by energy absorbing surfaces and thereby causing said detecting means to be operated from its said second distinctive condition to said first distinctive condition is still registered as a single vehicle.

8. The system as defined in claim 7 wherein said detection means includes a first electromagnetic relay being operated from a normal condition only when said receiving means receives a reflection of said beam smaller in amplitude than that normally received from said fixed reflecting surface and includes a second electromagnetic relay being operated from a normal condition only when said receiving means receives a reflection of said beam greater in amplitude than that normally received from said fixed reflecting surface, said registering means being operated to register the presence of a vehicle in said beam only when said second relay is operated from its said normal condition and remaining thereafter in said presence indicating condition until both said first and second relays have been restored to their said normal conditions.

9. In a system for detecting the presence of a vehicle as it passes through a detection zone the combination comprising, transmitting means for directing a zone-defining beam of energy across the path taken by said vehicle so as to impinge upon and be reflected from said vehicle but with said beam instead impinging upon and being reflected from a more distant reflecting surface when no vehicle is present, receiving means including means being positioned and directed to receive reflections of the transmitted energy both from said vehicle and from said more distant surface, said receiving means providing an output signal which is of substantially greater amplitude when said vehicle is present than when said vehicle is not present, storage means being at least at times connected to the output of said receiving means and storing therein a signal having at least one characteristic which varies in accordance with the amplitude of the output signal of said receiving means, comparison means being controlled jointly by the output of said receiving means and by the signal stored in said storage means, first detector means, said comparison means controlling said first detector means to a distinctive condition indicative of the presence of a vehicle in said detection zone whenever the output of said receiving means substantially exceeds the amplitude of the reflected signal which has heretofore been obtained from said fixed reflecting surface, and means controlled by said firt detector means when in its said distinctive condition to make said storage means non-responsive to the output of said receiving means to thereby prevent variation of the signal stored in said storage means when a vehicle is within said detection zone.

10. The system as defined according to claim 9 wherein said voltage storage means is a capacitor and said first detector means includes an electromagnetic relay which is actuated when said first detector means is operated to said distinctive condition and when thus actuated disconnects said capacitor from said receiving means.

11. The combination defined in claim 9 which includes additional detector means, said comparison circuit means controlling said additional detector means to a distinctive condition indicative of the presence of an energy absorbing surface within said beam whenever the output of said receiving means is substantially less than the amplitude of the reflected signal which has heretofore been obtained from said fixed reflecting surface, and means controlled by said additional detector means when in its said distinctive condition for preventing restoration of said first detector means to its normal condition, whereby a vehicle passing through said detection zone and having a plurality of energy reflecting surfaces interspersed by sound absorbing surfaces is prevented from being registered as more than a single vehicle.

References Cited in the file of this patent
UNITED STATES PATENTS

| | | |
|---|---|---|
| Re. 23,403 | Barker | Sept. 4, 1951 |
| 1,982,341 | Hitchcock | Nov. 27, 1934 |
| 2,965,893 | Barker | Dec. 20, 1960 |